United States Patent
Soliman et al.

(10) Patent No.: US 8,825,077 B2
(45) Date of Patent: Sep. 2, 2014

(54) METHOD AND SYSTEM FOR FEMTOCELL POSITIONING

(75) Inventors: Samir Salib Soliman, Poway, CA (US); Kaushik Chakraborty, San Diego, CA (US); Bongyong Song, San Diego, CA (US); Soumya Das, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/360,463

(22) Filed: Jan. 27, 2012

(65) Prior Publication Data

US 2013/0196680 A1    Aug. 1, 2013

(51) Int. Cl.
*H04W 24/00*    (2009.01)

(52) U.S. Cl.
USPC .................. 455/456.1; 455/404.1; 455/422.1; 455/552.1

(58) Field of Classification Search
USPC ................ 455/404.1, 422.1, 444, 448, 456.1, 455/63.1, 524, 502, 62, 552.1
See application file for complete search history.

(56) References Cited

U.S. PATENT DOCUMENTS

| | | | |
|---|---|---|---|
| 6,166,685 A | 12/2000 | Soliman | |
| 2004/0033808 A1 | 2/2004 | Rorabaugh | |
| 2005/0148368 A1* | 7/2005 | Scheinert et al. | 455/561 |
| 2007/0002813 A1 | 1/2007 | Tenny et al. | |
| 2008/0299992 A1 | 12/2008 | Eitan et al. | |
| 2009/0092096 A1 | 4/2009 | Czaja et al. | |
| 2009/0233551 A1* | 9/2009 | Haartsen et al. | 455/41.3 |
| 2009/0264137 A1 | 10/2009 | Soliman | |
| 2010/0144366 A1 | 6/2010 | Ishii et al. | |
| 2010/0167728 A1 | 7/2010 | Venkitaraman et al. | |
| 2011/0059752 A1 | 3/2011 | Garin et al. | |
| 2012/0015654 A1* | 1/2012 | Palanki et al. | 455/435.1 |
| 2012/0302254 A1* | 11/2012 | Charbit et al. | 455/456.1 |

FOREIGN PATENT DOCUMENTS

| | | |
|---|---|---|
| GB | 2 457 655 A | 8/2009 |
| WO | 2010/097063 A2 | 9/2010 |

OTHER PUBLICATIONS

International Search Report and Written Opinion—PCT/US2012/023049—ISA/EPO—Oct. 1, 2012.

* cited by examiner

*Primary Examiner* — Kwasi Karikari

(74) *Attorney, Agent, or Firm* — Silicon Valley Patent Group LLP

(57) ABSTRACT

Method and system for femtocell positioning are disclosed. An apparatus includes one or more processors, a femtocell positioning module configured to determine position of a femtocell, and a memory configured to store position of the femtocell. The femtocell positioning module, working with the one or more processors, includes logic configured to identify one or more wireless terminals and receive location information from the one or more wireless terminals via a first communication channel and determine position of the femtocell in accordance with the location information from the one or more wireless terminals. The femtocell positioning module further includes logic configured to obtain multiple set of range measurements between the femtocell and the one or more wireless terminals, logic configured to determine position of the femtocell in accordance with the location information and the multiple set of range measurements between the femtocell and the one or more wireless terminals.

46 Claims, 8 Drawing Sheets

METHOD AND SYSTEM FOR FEMTOCELL POSITIONING

FIELD

The present disclosure relates to the field of wireless communications. In particular, the present disclosure relates to method and system for femtocell positioning.

BACKGROUND

Femtocells have been deployed in homes, enterprises and wireless internet hot spots in recent years. In deploying a femtocell, it is necessary to determine its position prior to assigning an appropriate operating frequency to the femtocell to avoid interference between the femtocell and nearby cellular towers. For example, a femtocell may use signals received from Global Navigation Satellite System (GNSS), assisted Global Positioning System (GPS), cell towers, and broadcast television stations for positioning. However in some indoor environment, these signals can be weak or unavailable. This issue may hinder the deployment and operation of the femtocells, and lead to poor user experience.

Therefore, there is a need to address the above issue in femtocell deployment. In particular, there is a need for method and system that can determine position of a femtocell.

SUMMARY

Method and system for determining position of a femtocell are disclosed. In one embodiment, the method includes identifying one or more wireless terminals through a first communication channel, receiving location information from the one or more wireless terminals via the first communication channel, determining position of the femtocell in accordance with the location information from the one or more wireless terminals. The method of identifying one or more wireless terminals through a first communication channel further includes at least one of verifying the one or more wireless terminals and the femtocell are located in a same subnet, and verifying the one or more wireless terminals and the femtocell are located in a same macro cell area. The method of determining position of the femtocell includes obtaining multiple set of range measurements between the femtocell and the one or more wireless terminals, and determining position of the femtocell in accordance with the location information and the multiple set of range measurements between the femtocell and the one or more wireless terminals. The method of determining position of the femtocell further includes assigning a location of the one or more wireless terminals as the position of the femtocell. In this embodiment, each wireless terminal has obtained an initial position and performs repeated position updates with respect to one or more base stations, and the first communication channel includes an out-of-band link between a femtocell and the one or more wireless terminals.

The method further includes receiving provisioning information from a network based on the position of the femtocell, and transferring data between the network and the one or more wireless terminals using a second communication channel. The method further includes determining position of the femtocell in accordance with a weighted average position of the one or more wireless terminals. The second communication channel includes a broadband network and the out-of-band link includes at least one of Bluetooth and Wi-Fi. The out-of-band link may also include Remote IP Access (RIPA) connections between the one or more wireless terminals and the femtocell.

According to embodiments of the method, the range measurements may include estimated range measurement between the femtocell and a first wireless terminal at a first point in time, estimated range measurement between the femtocell and the first wireless terminal at a second point in time, and estimated range measurement between the femtocell and the first wireless terminal at a third point in time. The range measurements may further include estimated range measurement between the femtocell and a first wireless terminal at a first point in time, estimated range measurement between the femtocell and a second wireless terminal at the first point in time, estimated range measurement between the femtocell and the first wireless terminal at a second point in time, and estimated range measurement between the femtocell and the second wireless terminal at the second point in time. The range measurements may further include estimated direction and range measurement between the femtocell and a first wireless terminal at a first point in time, estimated direction and range measurement between the femtocell and the first wireless terminal at a second point in time. The range measurements may further include estimated direction and range measurement between the femtocell and a first wireless terminal at a first point in time, and estimated direction and range measurement between the femtocell and a second wireless terminal at the first point in time. The range measurements may further include estimated direction and range measurement between the femtocell and the first wireless terminal at a second point in time, and estimated direction and range measurement between the femtocell and the second wireless terminal at the second point in time.

In another embodiment, an apparatus includes one or more processors, a femtocell positioning module configured to determine position of a femtocell, and a memory configured to store position of the femtocell. The femtocell positioning module, working with the one or more processors, includes logic configured to identify one or more wireless terminals and receive location information from the one or more wireless terminals via a first communication channel. In this embodiment, each wireless terminal has obtained an initial position and performs repeated position updates with respect to one or more base stations, and the first communication channel includes an out-of-band link between a femtocell and the one or more wireless terminals. The femtocell positioning module further includes logic configured to determine position of the femtocell in accordance with the location information from the one or more wireless terminals. The logic configured to determine position of the femtocell includes logic configured to obtain multiple set of range measurements between the femtocell and the one or more wireless terminals, and logic configured to determine position of the femtocell in accordance with the location information and the multiple set of range measurements between the femtocell and the one or more wireless terminals. The logic configured to determine position of the femtocell further includes logic configured to assign a location of the one or more wireless terminals as the position of the femtocell.

In yet another embodiment, a computer program product for determining position of a femtocell includes a non-transitory medium storing computer programs for execution by one or more computer systems. The computer program product also includes code for identifying one or more wireless terminals through a first communication channel, code for receiving location information from the one or more wireless terminals via the first communication channel, and code for determining position of the femtocell in accordance with the location information from the one or more wireless terminals. The code for determining position of the femtocell includes code for obtaining multiple set of range measurements between the femtocell and the one or more wireless terminals, and code for determining position of the femtocell in accordance with the location information and the multiple set of range measurements between the femtocell and the one or more wireless terminals. The code for determining position of the femtocell further includes code for assigning a location of the one or more wireless terminals as the position of the femtocell. In this embodiment, each wireless terminal has obtained an initial position and performs repeated position updates with respect to one or more base stations, and the first communication channel includes an out-of-band link between a femtocell and the one or more wireless terminals.

BRIEF DESCRIPTION OF THE DRAWINGS

The aforementioned features and advantages of the disclosure, as well as additional features and advantages thereof, will be more clearly understandable after reading detailed descriptions of embodiments of the disclosure in conjunction with the following drawings.

DESCRIPTION OF EMBODIMENTS

Embodiments of determining position of a femtocell are disclosed. The following descriptions are presented to enable any person skilled in the art to make and use the disclosure. Descriptions of specific embodiments and applications are provided only as examples. Various modifications and combinations of the examples described herein will be readily apparent to those skilled in the art, and the general principles defined herein may be applied to other examples and applications without departing from the spirit and scope of the disclosure. Thus, the present disclosure is not intended to be limited to the examples described and shown, but is to be accorded the widest scope consistent with the principles and features disclosed herein.

Figure 1:
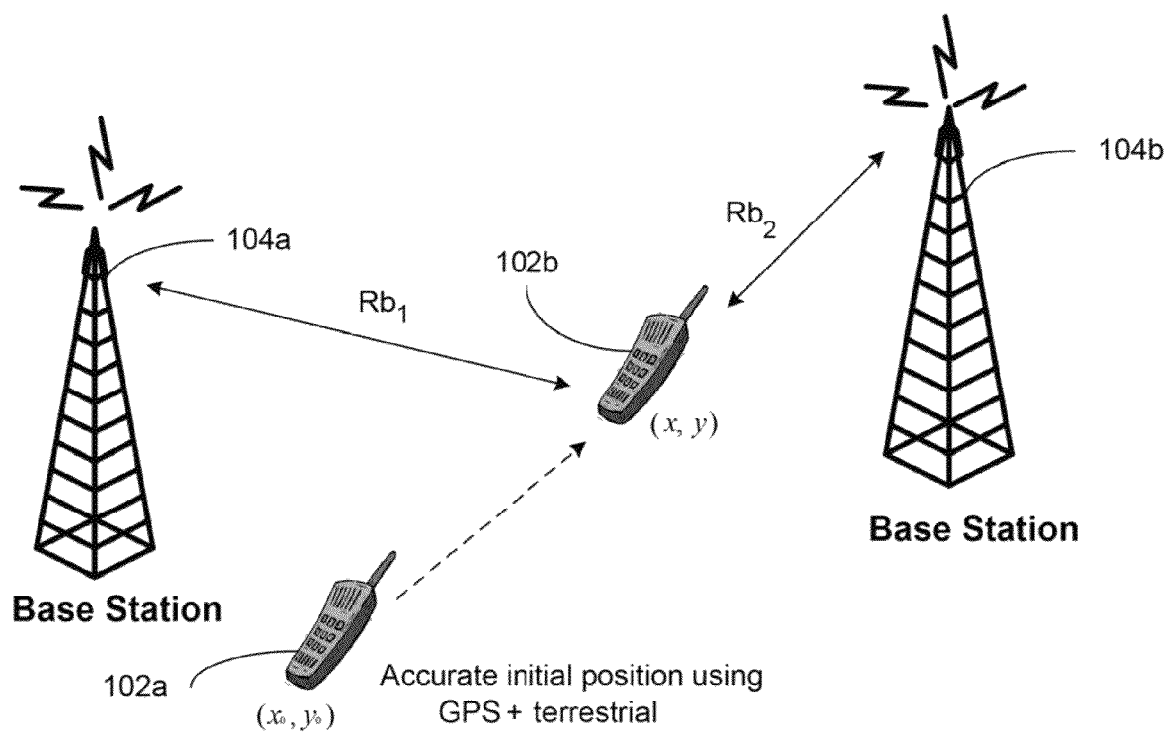
FIG. 1 illustrates a method of determining location of a wireless terminal according to some aspects of the present disclosure.

FIG. 1 illustrates a method of determining location of a wireless terminal according to some aspects of the present disclosure. As shown in FIG. 1, a wireless terminal 102a may take an accurate initial GPS/terrestrial position measurement and may store the position information in the wireless terminal 102a. As the wireless terminal moves to a different position (indicated by wireless terminal 102b), it may use the network infrastructure such as base stations (shown as 104a and 104b), to repeatedly update its position over time. This approach of having the wireless terminal automatically update its ranges or pseudo ranges (indicated by $Rb_1$ and $Rb_2$) from the base stations as the wireless terminal moves around may be advantageous than retrieving multiple accurate GPS position measurements. It is because the GPS engine of the wireless terminal may consume lots of power and resources to calculate a new position, in addition to being expensive and may not work well indoors. Another advantage of this approach over retrieving multiple accurate GPS position measurements is that the wireless wide area network (WWAN) and GPS receivers may share same front-end tuner, in which case the WWAN link would be suspended every time a GPS measurement is made, which results in loss of efficiency. In the disclosed approach, the wireless terminal obtains an accurate initial position, and keeps tracking of its position from the base stations (104a and 104b) instead of going back to the GPS satellite signal to obtain its incremental positions. Note that in situations when the wireless terminal enters a building where the GPS signal is unavailable or very weak, the wireless terminal may still continue to update its position using its ranges or pseudo ranges from the base stations.

Figure 2A:
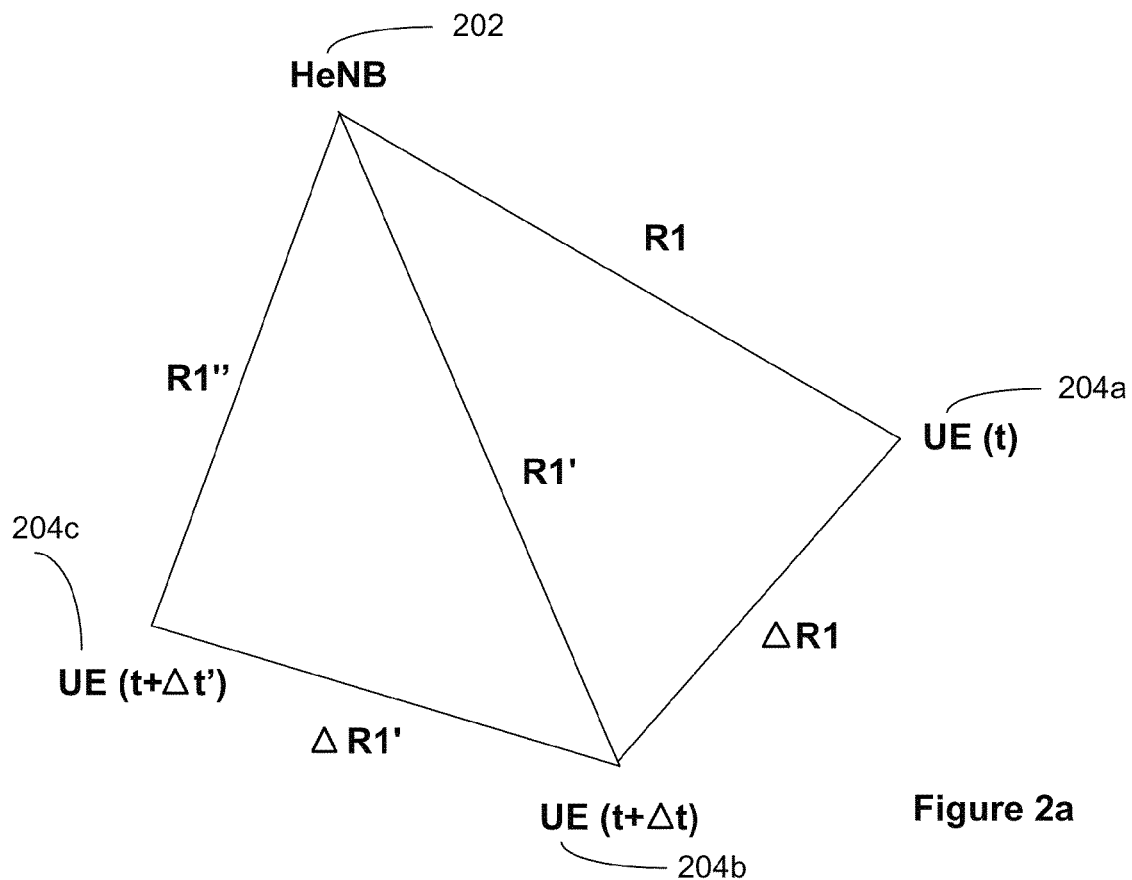
FIG. 2a illustrates a method of determining femtocell position with a wireless terminal according to some aspects of the present disclosure.

FIG. 2a illustrates a method of determining femtocell position with a wireless terminal according to some aspects of the present disclosure. In the exemplary figure shown in FIG. 2a, a Home eNodeB (HeNB) 202 represents a femtocell, and user equipment (UE) represents a wireless terminal. The wireless terminal may move to different locations over time, which is represented by numerals 204a, 204b, and 204c. In this example, R1 represents a range between the femtocell and the wireless terminal at time t; R1' represents a range between the femtocell and the wireless terminal at time t+Δt; and R1" represents a range between the femtocell and the wireless terminal at time t+Δt'. ΔR1 represents the distance moved by the wireless terminal from locations 204a to 204b; and ΔR1' represents the distance moved by the wireless terminal from locations 204b to 204c.

In one approach, the femtocell can be configured to detect one or more wireless terminals that are within a predetermined proximity. An out-of-band (OOB) link can be established between the femtocell and the one or more wireless terminals to allow the wireless terminals to transfer their corresponding position information to the femtocell. Note that as described in association with FIG. 1, each of the wireless terminals can be configured to update its positions with respect to the surrounding network infrastructures. The position information transferred from each of the wireless terminals to the femtocell includes the most recently updated position information of the wireless terminal. In addition, the femtocell can be configured to monitor the range or pseudo range measurements of the one or more wireless terminals, and use the range measurements to compute its position. In other embodiments, each wireless terminal can monitor its range from the femtocell and report the range to the femtocell for computing the position of the femtocell.

According to embodiments of the present disclosure, the out-of-band link may include a radio frequency link such as Bluetooth or Wi-Fi (IEEE 802.11). For example, when a wireless terminal is within a close proximity to a femtocell, the corresponding Bluetooth devices in the femtocell and the wireless terminal can discover each other, and establish an out-of-band link with one another.

Note that the OOB link may be any communication channel other than the primary direct wireless wide area network (WWAN) between the femtocell and the wireless terminal. The OOB link may include, but not limited to, wireless radio communication methods, such as Bluetooth or WiFi. For example, an OOB link may be implemented as an internet protocol connection between the femtocell and the wireless terminal established through a core network. In this example, information may flow from the wireless terminal, to a macro cell (with which the mobile is associated), to the core network, and via femtocell gateway to the femtocell (for example via the femtocell's backhaul connection). This OOB link does not require the femtocell to have another wireless radio interface.

In some implementations, the broadband (WWAN) network is used as the primary communication channel where the femtocell may serve as an access point for wireless terminals using the WWAN link. The out-of-band link may be referred to a secondary communication channel. In one approach, the OOB link is used to transfer positioning-related information when the femtocell is unable to operate its WWAN link. Upon establishing the out-of-band link, the femtocell can receive position information from the wireless terminal indicating its most updated current position, and the range between the wireless terminal and the femtocell. The femtocell continues to receive position information from the wireless terminal several times, and use the multiple data points received to determine its own position. A method to determine the position of femtocell using two sets of the range measurements, such as R1, R1', R1" of FIG. 2a, are described in association with FIG. 4 below.

Figure 2B:
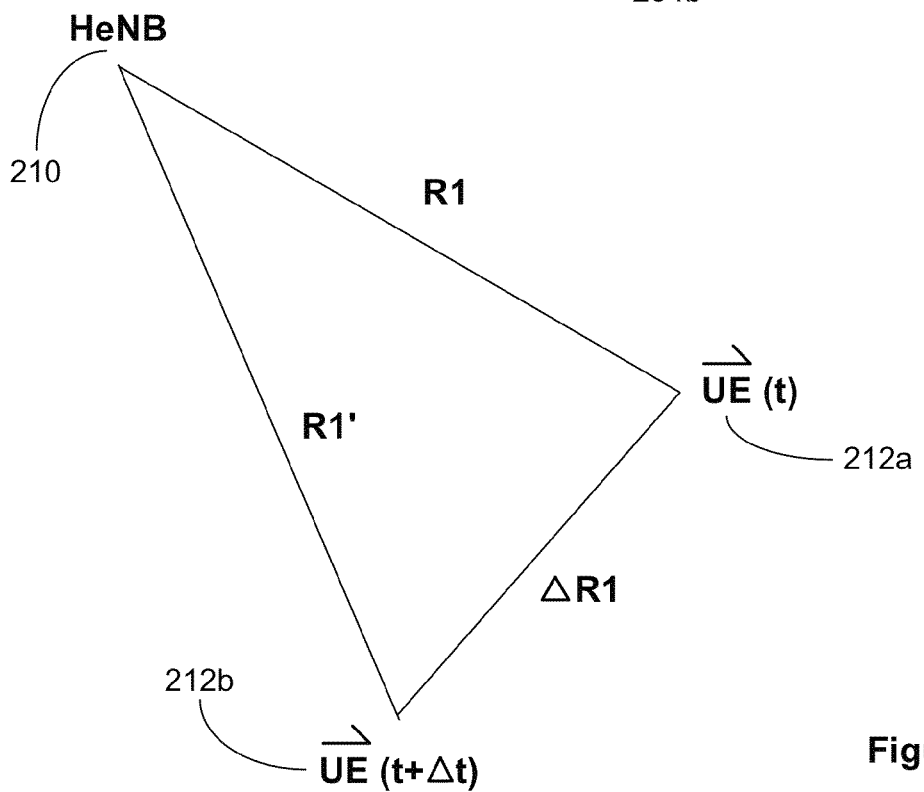
FIG. 2b illustrates another method of determining femtocell position with a wireless terminal according to some aspects of the present disclosure.

FIG. 2b illustrates another method of determining femtocell position with a wireless terminal according to some aspects of the present disclosure. In this example, the wireless terminal may have multiple-input and multiple-output (MIMO) capability that uses beam-forming techniques to provide information about direction of movement of the wireless terminal. With directional information, the femtocell can determine its position with two range measurements. Similar to FIG. 2a, a HeNB 210 represents a femtocell; user equipment (UE) represents a wireless terminal, and the arrow above the UE indicates the wireless terminal is equipped with the MIMO capability to provide directional information to the femtocell. The wireless terminal may move to different locations over time, which is represented by numerals 212a and 212b. In the example shown in FIG. 2b, R1 represents a range between the femtocell and the wireless terminal at time t; and R1' represents a range between the femtocell and the wireless terminal at time t+Δt. ΔR1 represents the distance moved by the wireless terminal from locations 212a to 212b.

Note that the MIMO capability can be used when there are multiple antennas on the wireless terminal, which allow the wireless terminal to use beam-forming technique to provide directional information between the femtocell and the wireless terminal. In the case shown in FIG. 2b, the wireless terminal can be configured to report its direction, and the location of the femtocell can be determined by the R1 and R1' and their respective direction information. In one implementation, a first line is determined between the femtocell and the UE at time t; and a second line is determined between the femtocell and the UE at time t+Δt. The intersection of the first line and the second line can be determined to be an estimated position of the femtocell.

Figure 3A:
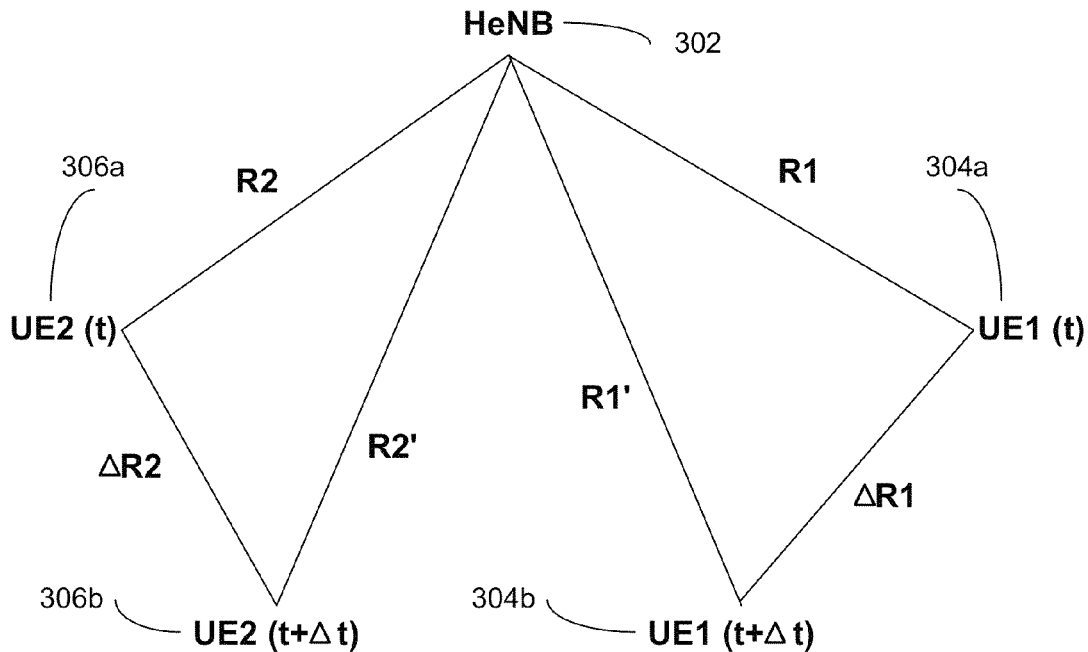
FIG. 3a illustrates a method of determining femtocell position with multiple wireless terminals according to some aspects of the present disclosure.

FIG. 3a illustrates a method of determining femtocell position with multiple wireless terminals according to some aspects of the present disclosure. FIG. 3a can represent the scenario when there are multiple wireless terminals available to provide their respective position information to the femtocell. For example, there are multiple cellular phone users in a household or in an office. In this case, instead of having one terminal with multiple position measurements, the femtocell can be configured to determine its position with multiple wireless terminals, and each wireless terminal can provide one range measurement to the femtocell.

In the exemplary figure shown in FIG. 3a, a Home eNodeB (HeNB) 302 represents a femtocell, a first wireless terminal is represented by UE1, and a second wireless terminal is represented by UE2. The wireless terminals may move around over time, which are represented by numerals 304a and 304b for wireless terminal UE1, and 306a and 306b for wireless terminal UE2. In this example, R1 represents a range between the femtocell and the wireless terminal UE1 at time t; R1' represents a range between the femtocell and the wireless terminal UE1 at time t+Δt; and ΔR1 represents the distance moved by the wireless terminal UE1 from locations 204a to 204b. Similarly, R2 represents a range between the femtocell and the wireless terminal UE2 at time t; R2' represents a range between the femtocell and the wireless terminal UE2 at time t+Δt; and ΔR2 represents the distance moved by the wireless terminal UE2 from locations 306a to 306b. A method to determine the position of femtocell using two sets of the range measurements, such as R1, R1', R2, R2', ΔR1, and ΔR2 of FIG. 3a, are described in association with FIG. 4 below.

Figure 3B:
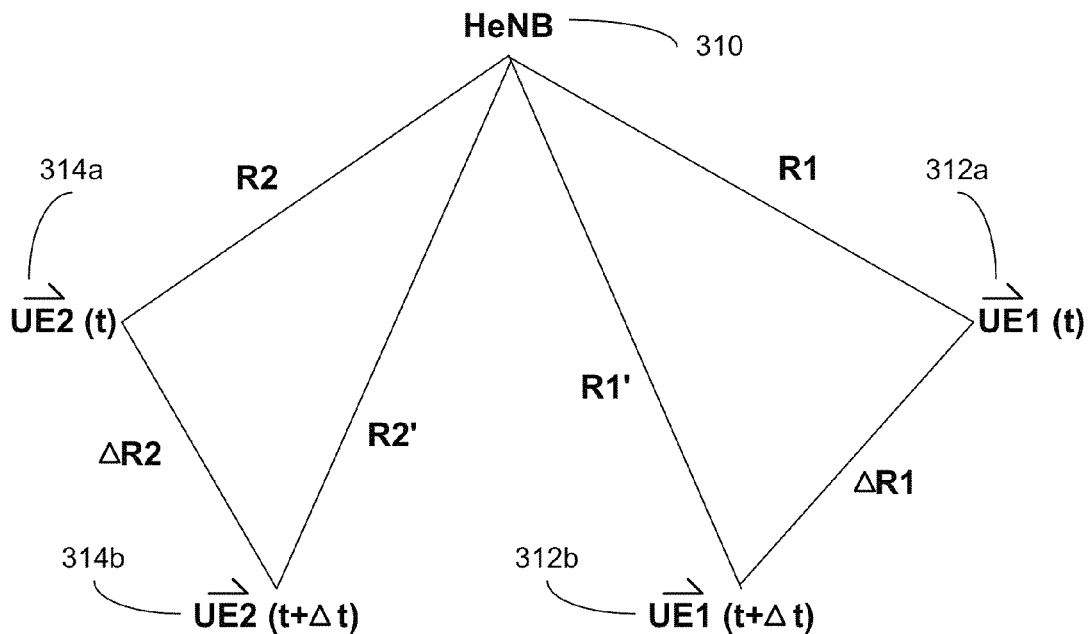
FIG. 3b illustrates another method of determining femtocell position with multiple wireless terminals according to some aspects of the present disclosure.

FIG. 3b illustrates another method of determining femtocell position with multiple wireless terminals according to some aspects of the present disclosure. Similar to the scenario shown in FIG. 2b, the wireless terminals may have MIMO capability that uses beam-forming techniques to provide information about direction of movement of the wireless terminals. With directional information, the femtocell can determine its position with two range measurements. As shown FIG. 3b, a Home eNodeB (HeNB) 310 represents a femtocell, a first wireless terminal is represented by UE1, and a second wireless terminal is represented by UE2. The arrow above a UE indicates the wireless terminal is equipped with the MIMO capability to provide directional information to the femtocell.

The wireless terminals may move around over time, which are represented by numerals 312a and 312b for wireless terminal UE1, and 314a and 314b for wireless terminal UE2. In this example, R1 represents a range between the femtocell and the wireless terminal UE1 at time t; R1' represents a range between the femtocell and the wireless terminal UE1 at time t+Δt; and ΔR1 represents the distance moved by the wireless terminal UE1 from locations 312a to 312b. Similarly, R2 represents a range between the femtocell and the wireless terminal UE2 at time t; R2' represents a range between the femtocell and the wireless terminal UE2 at time t+Δt; and ΔR2 represents the distance moved by the wireless terminal UE2 from locations 314a to 314b.

In one approach, a first line is determined between the femtocell and the UE1 at time t; and a second line is determined between the femtocell and the UE1 at time t+Δt. The intersection of the first line and the second line can be determined to be an estimated position of the femtocell. Note that with the directional information provided by the wireless terminals, the femtocell can use two range measurements from either one of the wireless terminals, namely UE1 or UE2, to compute its position, similar to the scenario described in FIG. 2b. With additional data from multiple wireless terminals, the femtocell may verify or refine its position with the additional data, such as R2, R2', ΔR2, and their corresponding directions from wireless terminal UE2. In another approach, the femtocell may determine its position from the one or more wireless terminals as follows. First, it obtains the most recently updated positions of the one or more wireless terminals. It then computes a weighted average position using the most recently updated positions of the one or more wireless terminals. The weighted average position can be used as an estimated position of the femtocell.

Figure 4:
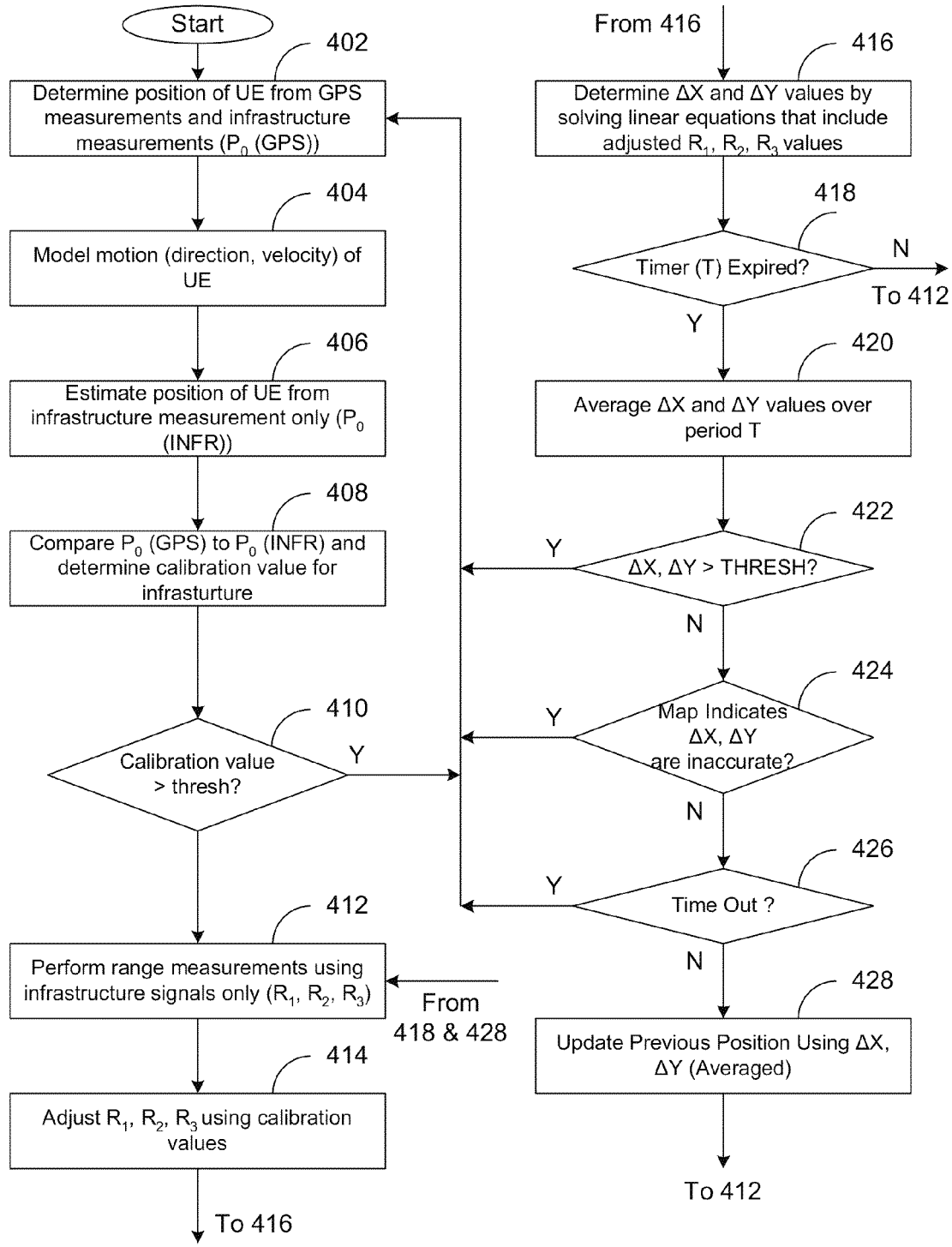
FIG. 4 illustrates a method of tracking position of a wireless terminal according to some aspects of the present disclosure.
Figure 5A:
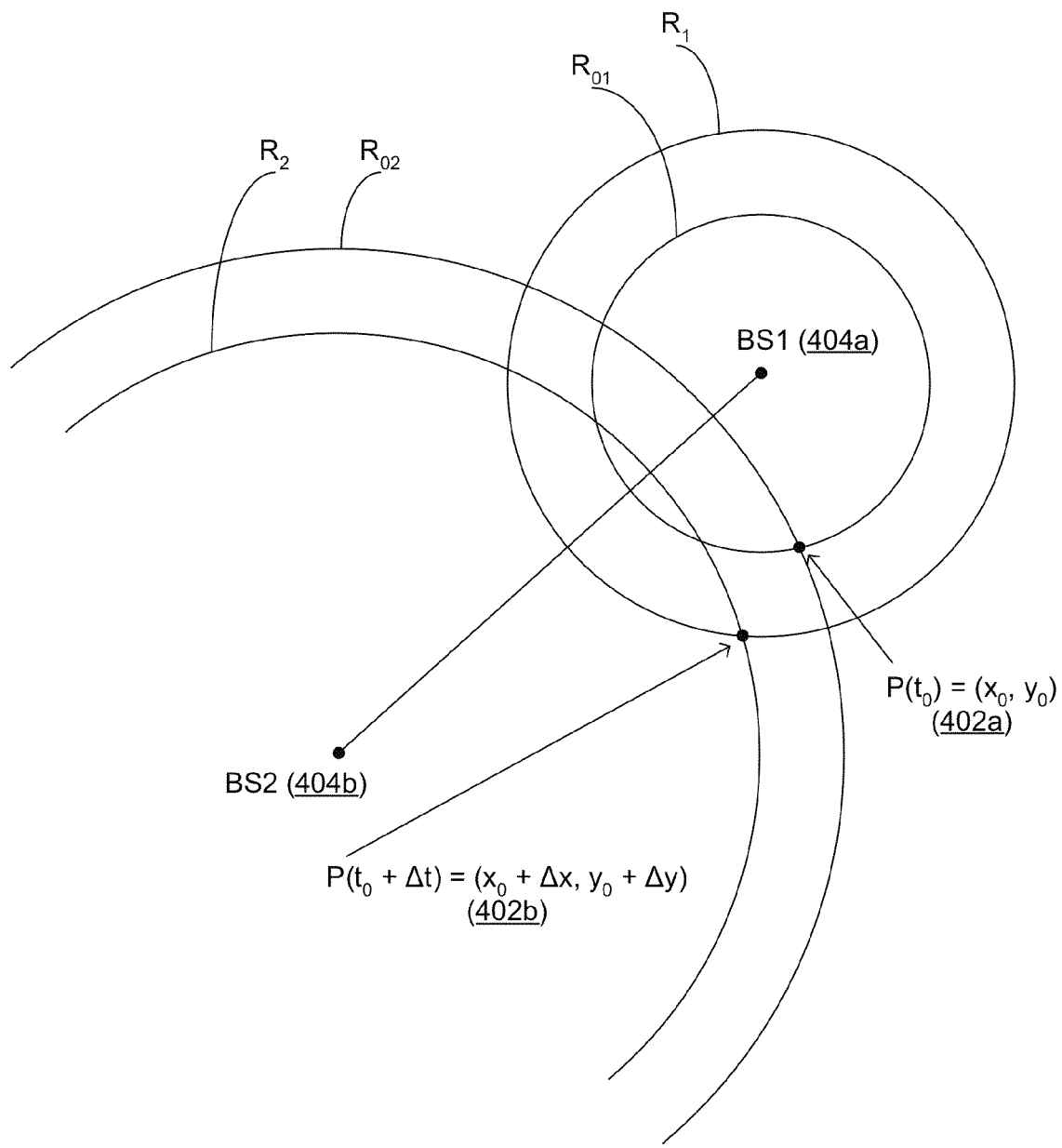
FIG. 5a illustrates a method of determining changes of wireless terminal positions according to some aspects of the present disclosure.

FIG. 4 illustrates a method of tracking position of a wireless terminal according to some aspects of the present disclosure. FIG. 5a illustrates a method of determining changes of wireless terminal positions according to some aspects of the present disclosure. Note that although the methods below are described in the context of the wireless terminal updating its positions with respect to network infrastructures such as base stations shown in FIG. 1, the methods are also applicable to determining position of a femtocell using sets of range measurements obtained in association with FIGS. 2a-2b and FIGS. 3a-3b.

According to embodiments of the present disclosure, a highly accurate initial position of the wireless terminal is determined using information from both the Global Position Satellite (GPS) system and timing information derived from the infrastructure of a mobile radio telephone communication system. For purposes of the present disclosure, the "infrastructure" of a mobile radio telephone system shall include the equipment associated with transmitting and receiving voice information or data information (e.g., internet or fax information) to and from the wireless terminal such as, for example, base stations, base station controllers, and mobile switching centers. Such infrastructure equipment could also include, for example, low-orbit earth satellites used for transmitting and receiving such voice or data information to and from wireless terminals. Excluded from the definition of infrastructure are earth-orbiting satellites that are not used to transmit or receive such voice or data information to or from a wireless terminal, such as those associated with the GPS system.

After the highly accurate initial position is determined using GPS measurements (and optionally using infrastructure measurements), the position of the wireless terminal is updated based only on measurements made using the system infrastructure until it is decided that the update has a poor quality. The infrastructure measurements that are used to perform the position updating include, for example, forward (down) link measurements such as pilot phase offset and pilot strength. They also include reverse (up) link measurements such as round-trip-delay (RTD) and signal-to-noise ratio (SNR). The pilot phase offset is proportional to the difference in range between any base station and one being used as a reference $R_2-R_1$. The round trip delay is a measure of twice the range between the base station and the wireless terminal, $2R_1$ assuming reciprocity between up and down links propagation delay, also assuming that all other hardware delays are calibrated. Estimation of the change in position of a wireless terminal using various combinations of these infrastructure measurements can be computed by the wireless terminal. In some implementations, the estimation calculation itself can be made either at the wireless terminal, or within the system infrastructure.

Referring now to FIG. 4, a method 400 for tracking the position of a wireless terminal that uses only infrastructure measurements to update an initial position for the wireless terminal determined using the GPS system, in accordance with embodiments of the present disclosure. In block 402, a highly accurate initial position of the wireless terminal is determined using measurements from both the GPS system and the system infrastructure. The highly accurate initial position ($P_0$ (GPS)) is determined in all three-dimensions in this block using differential GPS. In an alternate embodiment, the highly accurate initial position can be determined using at least three (and more) terrestrial base stations in the system infrastructure.

In block 404, the motion of the wireless terminal is modeled (using past positional measurements) in order to estimate the current direction and velocity of the wireless terminal. Map information, which places the wireless terminal on a path, which may be oriented in a known direction, may also be used to model the current direction of the wireless terminal. Filtering methods can further enhance this trajectory estimation technique. One example is to use a Kalman filter to adaptively track the mobile trajectory and hence predict its dynamic state in terms of speed and position.

In block 406, the initial position of the wireless terminal is estimated from positional measurements made using only the system infrastructure ($P_0$ (INFR)). The infrastructure measurements that are used to perform the position determination in this block include, for example, forward (down) link measurements such as pilot phase offset and pilot strength. They also include reverse (up) link measurements such as round-trip-delay (RTD) and signal-to-noise ratio (SNR). According to embodiments of the present disclosure, estimation of the position of a wireless terminal may be performed using various combinations of these infrastructure measurements and the calculation of the position in this block can be made either at the wireless terminal, or within the system infrastructure. In one approach, the positional determination ($P_0$ (INFR)) made in block 406, is performed using two measurements: (i) a phase offset measured at the wireless terminal of a pilot signal sent to the wireless terminal from a first base station (which places the wireless terminal on a hyperbola), and (ii) a round trip delay measurement between the wireless terminal and a second base station (which places the wireless terminal on a circle).

In block 408, the infrastructure system is aligned or calibrated by comparing the positional determinations ($P_0$ (GPS), $P_0$ (INFR)) made in blocks 402 and 406. In one embodiment, the range measurements used for determining the coordinates associated with the two positional determinations ($P_0$ (GPS), $P_0$ (INFR)) are compared, and the residual values that result from this comparison correspond to the difference (R1–R2) between a first range (R1) from a reference point (e.g., a base station) to $P_0$ (GPS) and a second range (R2) from the same reference point to $P_0$ (INFR). This difference is then divided by the speed of light in order to arrive at a calibration value that represents the time difference between the propagation time of a signal transmitted between a base station and $P_0$ (GPS), and the propagation time of a signal transmitted between the base station and $P_0$ (INFR). This calibration value is then used to adjust range measurements made using the infrastructure on the forward and reverse links associated with the wireless terminal as described below.

In block 410, the calibration value is compared to a threshold in order to assess the accuracy of the positional determination ($P_0$ (INFR)) made using only the infrastructure measurements in block 406. If the calibration measurement exceeds the threshold, this indicates that the positional determination ($P_0$ (INFR)) made using only the infrastructure measurements was sufficiently inaccurate that further updates of the initial positional measurement should not be made using infrastructure measurements only. In such cases, the system returns to block 402, and the position of the wireless terminal is updated by taking a new set of GPS measurements.

In blocks 412-416, one or more range measurements ($R_1$, $R_2$, $R_3$) are made using the infrastructure only, each range measurement is first adjusted (in block 414) by subtracting the calibration value from the measurement, and then the difference between the initial position of the wireless terminal and the current position of the wireless terminal $\Delta x$, $\Delta y$ is determined used the adjusted range measurements (block 416). Note that blocks 412-416 can alternatively be performed using three range measurements, two range measurements, or a single range measurement which is further described below. In one embodiment, the first range measurement is based on a phase offset associated with transmission of a pilot signal between the wireless terminal and a first base station antenna. The phase offset can be used to determine the value $2R_1$ (twice the distance between the wireless terminal and the first base station antenna), from which $R_1$ can be calculated. The second range measurement may then be based on a phase offset associated with transmission of the pilot signal from the wireless terminal to a second base station antenna. This further phase offset can be used to determine the value $R_1+R_2$, from which $R_2$ can be calculated given that $R_1$ is obtained from the first range measurement. Similarly, the third range measurement may be based on a phase offset associated with transmission of the pilot signal from the wireless terminal to a third base station antenna. This further phase offset can be used to determine the value $R_1+R_3$, from which $R_3$ can be calculated given that $R_1$ is obtained from the first range measurement.

FIG. 5a illustrates a method of determining changes of wireless terminal positions according to some aspects of the present disclosure. In FIG. 5a, an initial position of a wireless terminal at time $t_0$ is denoted as $p(t_0)=(x_0, y_0)$ (402a) and the position of the wireless terminal after time $\Delta t$ is denoted as $p(t_0+\Delta t)=(x_0+\Delta x, y_0+\Delta y)$ (402b). This exemplary figure shows a first base station BS 1 (404a) and a second base station BS2 (404b). The position of a base station i is denoted ($x_i$, $y_i$). The range measurement between the wireless terminal and the base station i at time $t_0$ is denoted $R_{i0}$, and the range measurement between the wireless terminal and the base station i at time $t_0+\Delta t$ is denoted as Equation (1) provides the range measurements between the wireless terminal and the base stations:

$$R_{0i}^2 = (x_0-x_i)^2 + (y_0-y_i)^2 \quad (1)$$

When the wireless terminal moves to point $p(t+\Delta t)$ which is at a distance ($\Delta x$, $\Delta y$) from $p(t_0)=(x_0, y_0)$, the new range measurements between the wireless terminal and the base stations are provided by equation (2) below:

$$(R_i)^2 = (x_0+\Delta x-x_i)^2 + (y_0+\Delta y-y_i)^2 \quad (2)$$

Equation (2) for i=1, 2 represents two circles which intersect at two points (see FIG. 5a). The new position of the wireless terminal can be found by selecting the point closest to $p(t_0)$.

Subtracting (2) from (1), yields, $$(R_i)^2 - (R_{0i})^2 = 2\Delta x(x_0-x_i) + 2\Delta y(y_0-y_i) + (\Delta x)^2 + (\Delta y)^2 \quad (3)$$

Equation (3) may be reduced to a linear equation by ignoring the last two elements (i.e., $\Delta x^2$, $\Delta y^2$) which are small compared to the remaining elements in the equation, as long as $\Delta t$ is small. As explained below, when range measurements are available from two or three base stations, equation (3) can be applied in its reduced linear form to solve for the distance ($\Delta x$, $\Delta y$). By using linear equations to solve for the distance ($\Delta x$, $\Delta y$), the present disclosure can provide a value for the distance ($\Delta x$, $\Delta y$) without having to solve non-linear equations. In addition, unknown hardware delays and channel impairments can be calibrated out.

In cases where range measurements from three base stations are available, the determination of the distance ($\Delta x$, $\Delta y$) can be reduced to solving a system of two linear equations each of which represents an application of the reduced version of equation (3) applied between a pair of base stations:

$$(R_2^2 - R_{02}^2) - (R_1^2 - R_{01}^2) = 2\Delta x(x_1 - x_2) + 2\Delta y(y_1 - y_2) \quad (4)$$

$$(R_3^2 - R_{03}^2) - (R_1^2 - R_{01}^2) = 2\Delta x(x_1 - x_3) + 2\Delta y(y_1 - y_3) \quad (5)$$

The above system of linear equations can be written as $$\begin{bmatrix} 2(x_1-x_2) & 2(y_1-y_2) \\ 2(x_1-x_3) & 2(y_1-y_3) \end{bmatrix} \begin{bmatrix} \Delta x \\ \Delta y \end{bmatrix} = \begin{bmatrix} (R_2^2-R_{02}^2)-(R_1^2-R_{01}^2) \\ (R_3^2-R_{03}^2)-(R_1^2-R_{01}^2) \end{bmatrix} \quad (6)$$

and equation (6) can be written in simplified form as equation (7) below:

$$Az = B \quad (7)$$

The system of linear equations in (7) can be solved for z in order to determine $\Delta x$ and $\Delta y$. In solving equation (7) for z, the values $x_1$, $x_2$, $x_3$, $y_1$, $y_2$ and $y_3$ may all be determined, as these are the coordinates of the base stations in the system. The values in B can be measured using both the wireless terminal and the base station in accordance with equation (8) below:

$$R_i^2 - R_j^2 = (R_i - R_j)(R_i + R_j) = \Phi \tau \quad (8)$$

where $\Phi$ is the normalized pilot phase offset between base stations i and j (the pilot from one of these base stations is used as a reference and the pilot from the other base station is a non-reference pilot used for determining the phase offset from the reference pilot), and r is the normalized round trip delay between the wireless terminal and the base station associated with the non-reference pilot signal. Ranges $R_i$ and $R_j$ may be measured at the two base stations with other means. Note that the solution obtained from equation (7) is an exact solution and no further approximation is involved.

In cases where range measurements from only two base stations are available, the determination of the distance ($\Delta x$, $\Delta y$) can also be accomplished by solving a system of linear equations. As noted above, equation (3) can be reduced or approximated by equation (9) below:

$$(R_i)^2 - (R_{0i})^2 \approx 2\Delta x(x_0 - x_i) + 2\Delta y(y_0 - y_i) \quad (9)$$

For i=1, 2, equation (9) can be written as $$\begin{bmatrix} 2(x_0-x_2) & 2(y_0-y_2) \\ 2(x_0-x_1) & 2(y_0-y_1) \end{bmatrix} \begin{bmatrix} \Delta x \\ \Delta y \end{bmatrix} \cong \begin{bmatrix} (R_2^2-R_{02}^2) \\ (R_1^2-R_{01}^2) \end{bmatrix} \quad (10)$$

Equation (10) can be written in simplified form as equation (11) below:

$$Cz \cong D \quad (11)$$

The system of linear equations in (11) can be solved for z in order to determine $\Delta x$ and $\Delta y$ given infrastructure measurements from only two base stations.

In cases where range measurements from only a single base station are available, the determination of the distance ($\Delta x$, $\Delta y$) can also be accomplished if the direction of travel (m) of the wireless terminal is obtained from the modeling performed in block 404. In such cases, the $\Delta x$ and $\Delta y$ values can be determined by solving equations (12) and (13) below:

$$R_1^2 - R_{o1}^2 = 2\Delta x(x_0 - x_i) + 2\Delta y(y_0 - y_i) \quad (12)$$

$$\Delta y = m\Delta x \quad (13)$$

Solution of equations (12) and (13) represents a method for solving for $\Delta x$ and $\Delta y$, because once the system determines the initial position of the wireless terminal (block 402), computer mapping can be used to determine the path the wireless terminal is travelling on and the slope (m) or angular orientation of the path. The sign of the vector $R_1 - R_{O1}$ is then used to determine the direction of travel of the wireless terminal. Solving equations (12) and (13), yields $$\Delta x = ((R_1)^2 - (R_{01})^2)/(2(x_o - x_1) - 2m(y_0 - y_1)) \quad (14)$$

$$\Delta y = m((R_1)^2 - (R_{01})^2)/(2(x_o - x_1) - 2m(y_0 - y_1)) \quad (15)$$

Note that the position update is typically done at the infrastructure side (e.g., base station, base station controller or other control center). In addition, the determination of $\Delta x$ and $\Delta y$ and the updating of the position of the wireless terminal can be done at the wireless terminal if the following information is sent to it by the system infrastructure: (i) the location of a first base station $x_1$, $y_1$, (ii) the initial position $x_0$, $y_0$ of the wireless terminal from block 102, (iii) the slope or orientation (m) of the path that the wireless terminal is traveling, and (iv) the distance $R_1$.

Referring again to FIG. 4, after the individual values for $\Delta x$ and $\Delta y$ are calculated, in block 418 the process of making the infrastructure measurements and determining the $\Delta x$ and $\Delta y$ values for each set of measurements (blocks 412-416) is repeated over a period of time until a timer times out. A plurality of successively calculated values of $\Delta x$ and $\Delta y$ are generated during the period that the timer is active, and then in block 420 these values are averaged. In one embodiment, separate $\Delta x$ and $\Delta y$ values are calculated every 20 ms, and these values are then averaged over a period of 1 second (i.e., the period of the timer used in block 418) in order to filter the individual $\Delta x$ and $\Delta y$ values calculated using blocks 412-416.

In block 422, the averaged $\Delta x$ and $\Delta y$ values from block 420 are compared to a threshold. The purpose of the threshold in block 422 is to assess whether the positional measurements made using only the infrastructure in blocks 412-416 indicate that there has been a large change in the position of the wireless terminal since its position was last updated. If this assessment indicates such a large change, then the system concludes that the averaged $\Delta x$ and $\Delta y$ values from block 420 may be too inaccurate and the update process has degraded to the extent that the system needs a new GPS measurement. In such cases, the system returns to block 402 and the process begins again by determining a new highly reliable initial position using GPS measurements. The value of the threshold used in block 424 is a matter of design choice and represents the decision a system designer can make to trade off inaccuracies in the position of the wireless terminal before replacing the current position with a new highly reliable value using GPS measurements.

In block 424, the averaged $\Delta x$ and $\Delta y$ values from block 420 are compared to the modeled position of the wireless terminal from block 404 in order to determine whether, for example, the averaged $\Delta x$ and $\Delta y$ values place the wireless terminal on a path where it would be unlikely for the wireless terminal to be traveling given the last prior position of the wireless terminal. Again, the purpose of block 424 is to assess whether, based on the map information and modeling information from block 404, the positional measurements made using only the infrastructure in blocks 412-416 may be too inaccurate to use for updating the position of the wireless terminal. If this is the case, the system returns to block 402 and the process begins again by determining a new highly reliable initial position using GPS measurements.

Next, the system checks in block 426 to determine whether a further timer has expired. In the embodiment of the present disclosure, updating the position of the wireless terminal using only infrastructure measurements continues at most for a predetermined amount of time after which the system returns to block 402 and the process begins again by determining a new highly reliable initial position using GPS measurements. In one embodiment, a timer may be set to about three minutes. Note that the limit of this timer is a matter of design choice and represents a decision that a system designer can make to allow the positional measurement of the wireless terminal to decay before replacing the positional measurement with a new highly reliable value using GPS measurements.

In block 428, if the averaged $\Delta x$ and $\Delta y$ values from block 420 are not rejected in blocks 422-426, then the averaged $\Delta x$ and $\Delta y$ values from block 420 are used to update the previous position of the wireless terminal, and the process is then repeated from block 412.

In the embodiment of method 400, a receiver in the wireless terminal may be switched temporarily from a frequency associated with voice or data (e.g., interne or fax) traffic to a frequency associated with the GPS system in order to make the positional measurements from the GPS system in block 402. After the GPS measurements have been made, the receiver in the wireless terminal is then tuned from the frequency associated with GPS back to the frequency associated with the voice or data traffic. Thus, during the remainder of position updating process (i.e., blocks 404-428), the receiver in the wireless terminal remains tuned to the voice or data traffic frequency because only measurements made using the system infrastructure are used to update the initial position in blocks 404-428.

Figure 5B:
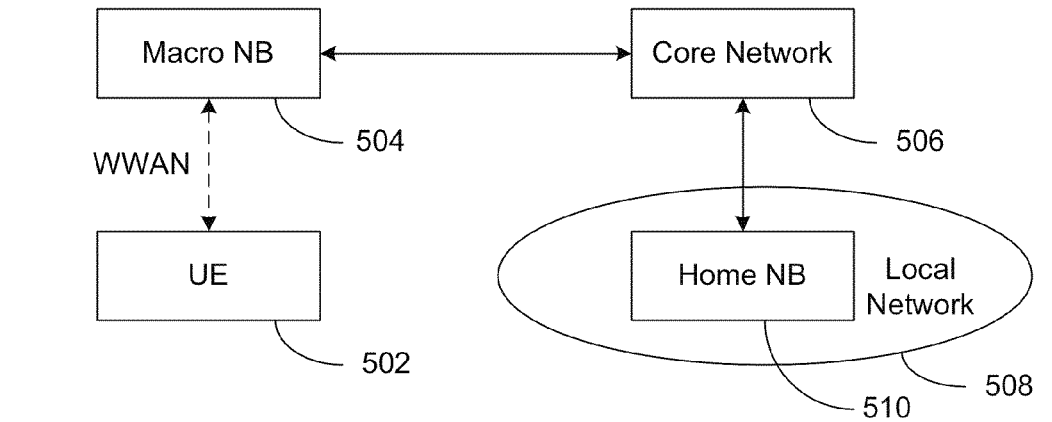
FIG. 5b illustrates a method for establishing connections between a femtocell and a wireless terminal via a Remote IP Access (RIPA) session according to embodiments of the present disclosure.

FIG. 5b illustrates a method for establishing connections between a femtocell and a wireless terminal via a Remote IP Access (RIPA) session according to embodiments of the present disclosure. As shown in FIG. 5b, the OOB link may be established by initiating a RIPA session, which allows a wireless terminal 502 to connect to a macro NB 504, a core network 506, and a local network 508 at user's home/office and exchange IP data with the local network 508 via a secure remote channel. Note that the RIPA session between the femtocell and the wireless terminal may be established whether the wireless terminal 502 is located in proximity to the femtocell 510 or in a remote area from the femtocell 510 as long as the wireless terminal 502 stays in the WWAN coverage area. In one approach, the method ensures the wireless terminal 502 is in close proximity to the femtocell 510 before communicating the location information of the wireless terminal 502 to the femtocell 510 over the RIPA session. This may be done using a macro cell based femtocell fingerprint technique as described in association with FIG. 5c.

Figure 5C:
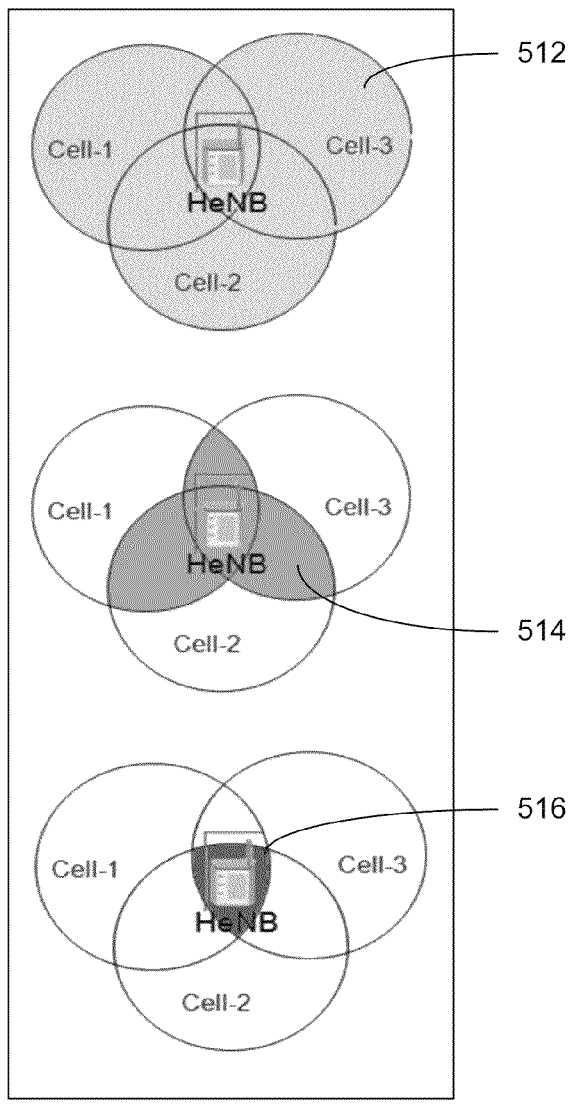
FIG. 5c illustrates methods to determine fingerprint of a femtocell according to embodiments of the present disclosure.

FIG. 5c illustrates methods to determine fingerprint of a femtocell according to embodiments of the present disclosure. In the examples shown in FIG. 5c, a femtocell (HeNB)

is surrounded by three macro cells, namely Cell-1, Cell-2, and Cell-3. In one implementation, the femtocell fingerprint can be defined as the union of surrounding macro cells:

HeNB Fingerprint 1(shown as shaded area 512)=union (Cell ID-1, Cell ID-2, Cell ID-3).

In another implementation, the femtocell fingerprint can be defined as the union of intersections of surrounding macro cells:

HeNB Fingerprint 2 (shown as shaded area 514)=union{intersection (Cell ID-1, Cell ID-2), intersection (Cell ID-2, Cell ID-3), intersection (Cell ID-1,Cell ID-3)}

In yet another implementation, the femtocell fingerprint can be defined as the intersection of surrounding macro cells:

HeNB Fingerprint 3 (shown as shaded area 516)=intersection (Cell ID-1, Cell ID-2, Cell ID-3)

The femtocell obtains the location information from the wireless terminal when the wireless terminal is located in the macro cell area identified by the femtocell fingerprint.

Figure 5D:
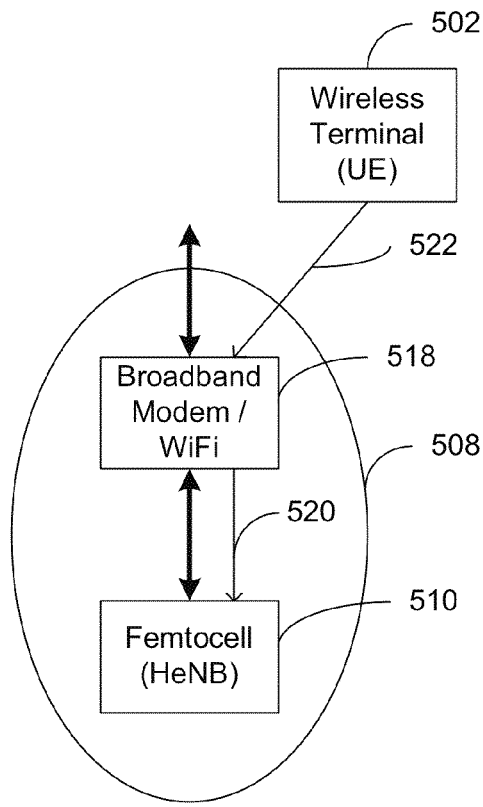
FIG. 5d illustrates a method of detecting proximity of a wireless terminal via non-integrated WiFi OOB according to embodiments of the present disclosure.

FIG. 5*d* illustrates a method of detecting proximity of a wireless terminal via non-integrated WiFi OOB according to embodiments of the present disclosure. As shown in FIG. 5*d*, femtocell 510 is connected to the broadband modem 518 via Ethernet, and the wireless terminal 502 is connected to the broadband modem via WiFi. In this configuration, the femtocell 510 and the wireless terminal 502 reside in the same subnet although the femtocell does not have a WiFi OOB. One way of detecting the existence of the wireless terminal 502 is to monitor the Dynamic Host Configuration Protocol (DHCP) Request message (indicated by arrow 520) that the broadband modem 518 may broadcast in response to the IP address request (indicated by arrow 522) from the wireless terminal requests per the DHCP. In one approach, the femtocell 510 may be pre-configured with one or more wireless terminals MAC addresses. Whenever it receives the DHCP Request message for one of the MAC addresses, the wireless terminal 502 may be determined to be in proximity of the femtocell. In another embodiment, a femtocell installation application in the wireless terminal 502 may send a femtocell discovery message requesting a response from the femtocell over WiFi via IP multicast to the entire subnet. A multicast enabled broadband router may forward this multicast IP packet to the femtocell 510 and the femtocell positioning module in the femtocell 510 may respond with a femtocell discovery response message to inform its presence to the wireless terminal 502. Since the scope of IP multicasting is limited to the subnet, this procedure ensures that the femtocell and the wireless terminal are in close proximity (i.e., in the same subnet). Note that the femtocell installation application in the wireless terminal can be provisioned over-the-air (OTA) by a network operator or downloaded by the user according to guidelines of the network operator.

In addition to the proximity detection based on out-of-band connection between a femtocell and the one or more wireless terminals, the disclosed implementations may include additional means for verifying the location information from the one or more wireless terminals are trustworthy and not altered. For example, the femtocell positioning module may be configured to verify the genuineness of the communication counterpart at the one or more wireless terminals. A communication counterpart at the one or more wireless terminals can be provisioned over-the-air (OTA) by a network operator or downloaded by the user according to guidelines of the network operator.

One way of checking genuineness of the communication counterpart at the one or more wireless terminals is to define an authentication procedure between the femtocell positioning module and the communication counterpart at the one or more wireless terminals. In one embodiment of authentication, the authentication credential may be a hashed output of the identities of the one or more wireless terminals such as International Mobile Subscriber Identity. In one implementation, only the genuine communication counterpart may have the specific hash function that produces the proper authentication credential that the femtocell positioning module is anticipating. The femtocell may receive from the network a list of authentication credentials associated with the one or more wireless terminals from the network. The communication counterpart at a given wireless terminal may be declared to be genuine only when the authentication credential received from the wireless terminal matches one of the entries.

Figure 6:
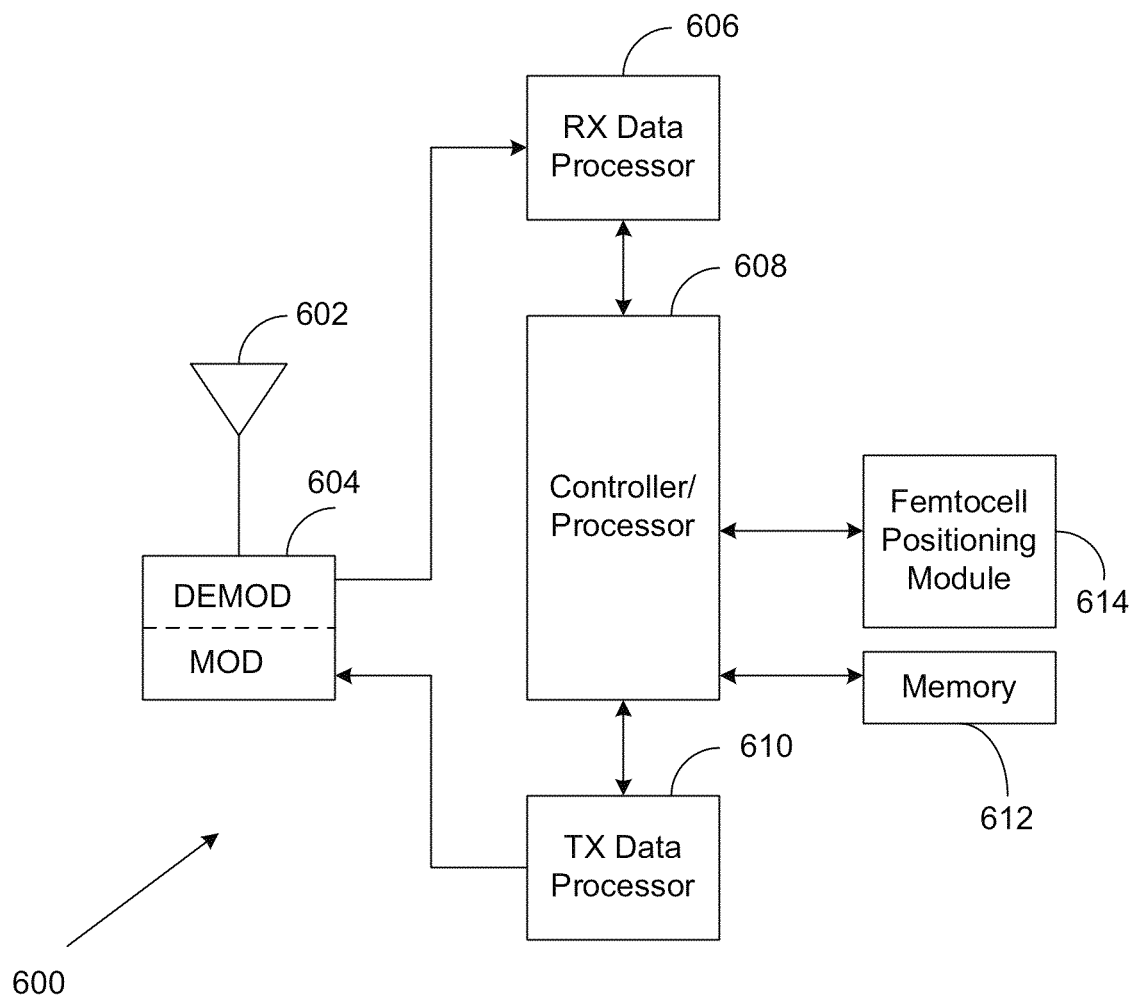
FIG. 6 illustrates a block diagram of an apparatus for determining position of a femtocell according to some aspects of the present disclosure.

FIG. 6 illustrates a block diagram of an exemplary apparatus for determining position of a femtocell according to some aspects of the present disclosure. At the apparatus 600, antenna 602 is configured to receive modulated signals from a base station or signals from one or more wireless terminals, and provides the received signals to a demodulator (DE-MOD) part of a modem 604. The demodulator processes (e.g., conditions and digitizes) the received signal and obtains input samples. It further may perform orthogonal frequency-division multiplexing (OFDM) demodulation on the input samples and provides frequency-domain received symbols for all subcarriers. An RX data processor 606 processes (e.g., symbol de-maps, de-interleaves, and decodes) the frequency-domain received symbols and provides decoded data to a controller/processor 608 of the apparatus 600. In other embodiments, the exemplary apparatus can be configured to work with code division multiple access (CDMA) based systems.

The controller/processor 608 can be configured to control the apparatus 600 to communicate with a server via a wireless network. A TX data processor 610 generates signaling symbols, data symbols, and pilot symbols, which can be processed by modulator (MOD) of modem 604 and transmitted via the antenna 602 to a base station or to the one or more wireless terminals. In addition, the controller/processor 608 directs the operation of various processing units at the apparatus. Memory 612 can be configured to store program codes and data. Femtocell positioning module 614 can be configured to determine positions of the femtocell relative to the one or more wireless terminals over a period of time. The femtocell positioning module can also be configured to communication information between a femtocell and one or more wireless terminals.

Figure 7:
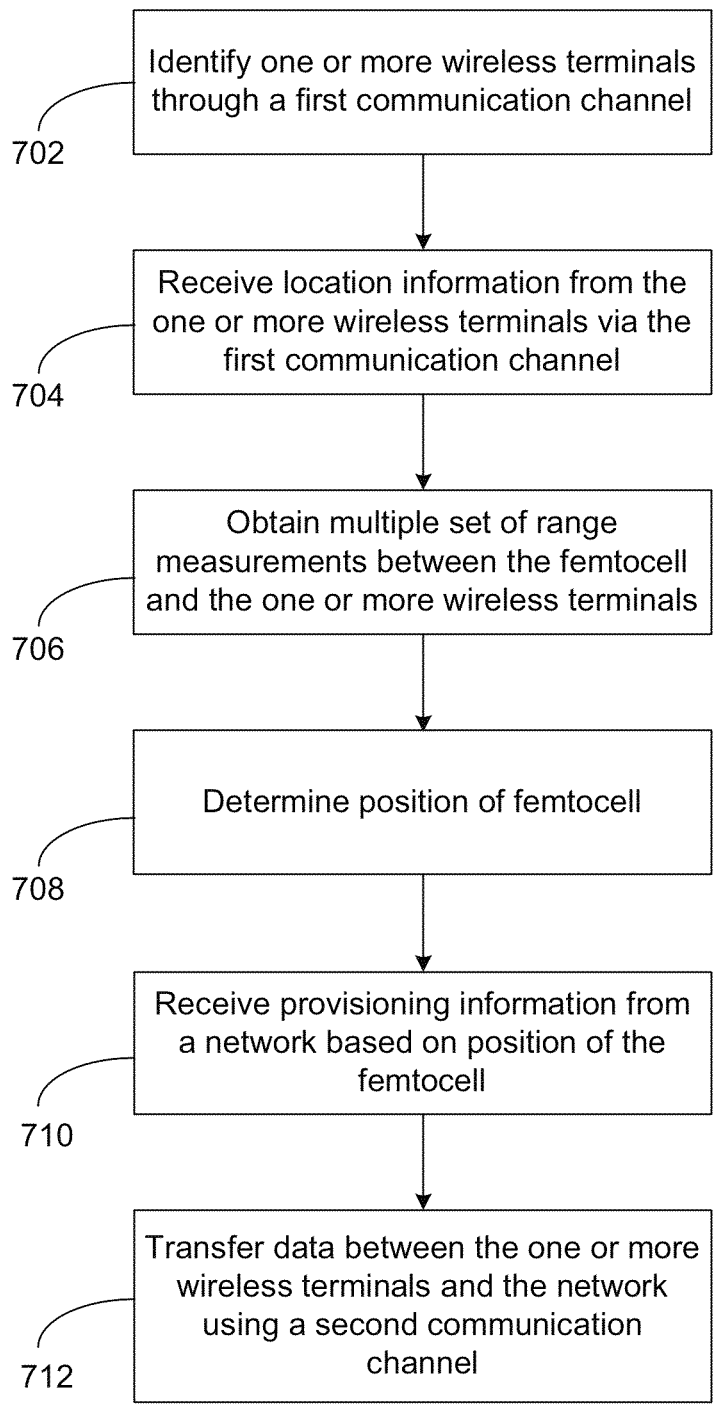
FIG. 7 illustrates a method performed by the femtocell positioning module of FIG. 6 according to some aspects of the present disclosure.

FIG. 7 illustrates a method performed by the femtocell positioning module of FIG. 6 according to some aspects of the present disclosure. In this exemplary embodiment, in block 702, the method identifies one or more wireless terminals through a first communication channel, which is also referred to as an out-of-band link. The out-of-band link may include Bluetooth, WiFi (IEEE 802.11), or other out-of-band communication means. In block 704, the method receives location information from the one or more wireless terminals via the first communication channel. The location information includes the most recently updated locations of the one or more wireless terminals with respect to the network infrastructures, such as base stations, near the one or more wireless terminals. In block 706, the method obtains multiple set of range measurements between the femtocell and the one or more wireless terminals. In block 708, the method determines position of the femtocell using the location information received and the multiple set of ranges measurements between the femtocell and the one or more wireless terminals. In block 710, the method receives provisioning information from a network operator based on position of the femtocell. In block 712, the method routes data between the one or more wireless terminals and the network using a second wireless channel, such as wireless local-area networks (LANs) and broadband (cable/DSL) networks.

There are numerous benefits of having the ability to determine position of the femtocell. First, a mobile network operator can use the position information to provision the femtocell with appropriate operating frequencies, taking into consideration of the base stations in the area, and therefore minimize signal interference between the femtocell and the base stations. For example, a network operator can determine a particular femtocell is installed at business address XYZ. If this location is very close to the street that has a base station operating at frequency F1, then the network operator can provision the femtocell to operate at a frequency F2, avoiding possible interference with other mobile devices nearby that communicates with the base station.

In addition, the femtocell can be configured to provide better services to nearby wireless terminals; even in locations such as inside of a building where GPS signals received by the wireless terminals is weak or unavailable. For example, the femtocell can be used to reduce amount of data transmitted between the wireless terminal and the base station, which in turn offload the bandwidth of the wireless network.

Furthermore, it is desirable to be able to determine the position of a femtocell in order to be in compliance with a Federal Communications Commission (FCC) regulation that requires carriers in the United States to be able to locate the position of a cellular telephone making an emergency "911" call within 50 meters for 67 percent of such calls and within 150 meters for 95 percent of such calls.

Note that paragraphs [0070]-[0072], FIG. 6, FIG. 7 and their corresponding descriptions provide means for identifying one or more wireless terminals through a first communication channel, means for receiving location information from the one or more wireless terminals via the first communication channel, and means for determining position of the femtocell in accordance with the location information from the one or more wireless terminals. Paragraphs [0070]-[10072], FIG. 6, FIG. 7 and their corresponding descriptions provide means for obtaining multiple set of range measurements between the femtocell and the one or more wireless terminals, means for determining position of the femtocell in accordance with the location information and the multiple set of range measurements between the femtocell and the one or more wireless terminals, and means for assigning a location of the one or more wireless terminals as the position of the femtocell. Paragraphs [0070]-[0072], FIG. 6, FIG. 7 and their corresponding descriptions further provide means for receiving provisioning information from a network based on the position of the femtocell, and means for transferring data between the network and the one or more wireless terminals using a second communication channel, where the second communication channel includes a broadband network. Paragraphs [0070]-[0072], FIGS. 2a-2b, FIGS. 3a-3b, FIG. 6, FIG. 7 and their corresponding descriptions further provide means for determining position of the femtocell in accordance with a weighted average position of the one or more wireless terminals.

The methodologies described herein can be implemented by various means depending upon the application. For example, these methodologies can be implemented in hardware, firmware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof. Herein, the term "control logic" encompasses logic implemented by software, hardware, firmware, or a combination.

For a firmware and/or software implementation, the methodologies can be implemented with modules (e.g., procedures, functions, and so on) that perform the functions described herein. Any machine readable medium tangibly embodying instructions can be used in implementing the methodologies described herein. For example, software codes can be stored in a memory and executed by a processing unit. Memory can be implemented within the processing unit or external to the processing unit. As used herein the term "memory" refers to any type of long term, short term, volatile, nonvolatile, or other storage devices and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media may take the form of an article of manufacturer. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

The disclosure may be implemented in conjunction with various wireless communication networks such as a wireless wide area network (WWAN), a wireless local area network (WLAN), a wireless personal area network (WPAN), and so on. The terms "network" and "system" are often used interchangeably. The terms "position" and "location" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a Long Term Evolution (LTE) network, a WiMAX (IEEE 802.16) network and so on. A CDMA network may implement one or more radio access technologies (RATs) such as cdma2000, Wideband-CDMA (W-CDMA), and so on. Cdma2000 includes IS-95, IS2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be implemented in conjunction with any combination of WWAN, WLAN and/or WPAN.

A mobile station refers to a device such as a cellular or other wireless communication device, personal communication system (PCS) device, personal navigation device (PND), Personal Information Manager (PIM), Personal Digital Assistant (PDA), laptop or other suitable mobile device which is capable of receiving wireless communication and/or navigation signals. The term "mobile station" is also intended to include devices which communicate with a personal navigation device (PND), such as by short-range wireless, infrared, wire line connection, or other connection—regardless of whether satellite signal reception, assistance data reception, and/or position-related processing occurs at the device or at the PND. Also, "mobile station" is intended to include all devices, including wireless communication devices, computers, laptops, etc. which are capable of communication with a server, such as via the Internet, Wi-Fi, or other network, and regardless of whether satellite signal reception, assistance data reception, and/or position-related processing occurs at the device, at a server, or at another device associated with the network. Any operable combination of the above are also considered a "mobile station."

Designation that something is "optimized," "required" or other designation does not indicate that the current disclosure applies only to systems that are optimized, or systems in which the "required" elements are present (or other limitation due to other designations). These designations refer only to the particular described implementation. Of course, many implementations are possible. The techniques can be used with protocols other than those discussed herein, including protocols that are in development or to be developed.

One skilled in the relevant art will recognize that many possible modifications and combinations of the disclosed embodiments may be used, while still employing the same basic underlying mechanisms and methodologies. The foregoing description, for purposes of explanation, has been written with references to specific embodiments. However, the illustrative discussions above are not intended to be exhaustive or to limit the disclosure to the precise forms disclosed. Many modifications and variations are possible in view of the above teachings. The embodiments were chosen and described to explain the principles of the disclosure and their practical applications, and to enable others skilled in the art to best utilize the disclosure and various embodiments with various modifications as suited to the particular use contemplated.

We claim:

1. A method for determining position of a femtocell, comprising:
   identifying one or more wireless terminals through a first communication channel, wherein each wireless terminal has obtained an initial position and performs repeated position updates with respect to one or more base stations, and wherein the first communication channel includes an out-of-band link between the femtocell and the one or more wireless terminals;
   receiving location information from the one or more wireless terminals via the first communication channel;
   determining position of the femtocell in accordance with the location information from the one or more wireless terminals; and
   receiving provisioning information from a network based on the position of the femtocell, wherein the receiving provisioning information from the network comprises receiving a list of authentication credentials associated with the one or more wireless terminals from the network, and authenticating the one or more wireless terminals using the list of authentication credentials.

2. The method of claim 1, wherein identifying one or more wireless terminals through a first communication channel further comprises at least one of:
   verifying the one or more wireless terminals and the femtocell are located in a same subnet; and
   verifying the one or more wireless terminals and the femtocell are located in a same macro cell area.

3. The method of claim 1, wherein determining position of the femtocell comprises:
   obtaining multiple set of range measurements between the femtocell and the one or more wireless terminals; and
   determining position of the femtocell in accordance with the location information and the multiple set of range measurements between the femtocell and the one or more wireless terminals.

4. The method of claim 1, further comprises:
   transferring data between the network and the one or more wireless terminals using a second communication channel, wherein the second communication channel includes a broadband network.

5. The method of claim 1, wherein the out-of-band link includes at least one of Bluetooth and Wi-Fi, and wherein the out-of-band link includes Remote IP Access (RIPA) connections between the one or more wireless terminals and the femtocell.

6. The method of claim 3, wherein the range measurements comprises:
   estimated range measurement between the femtocell and a first wireless terminal at a first point in time;
   estimated range measurement between the femtocell and the first wireless terminal at a second point in time; and
   estimated range measurement between the femtocell and the first wireless terminal at a third point in time.

7. The method of claim 3, wherein the range measurements further comprises:
   estimated range measurement between the femtocell and a first wireless terminal at a first point in time;
   estimated range measurement between the femtocell and a second wireless terminal at the first point in time;
   estimated range measurement between the femtocell and the first wireless terminal at a second point in time; and
   estimated range measurement between the femtocell and the second wireless terminal at the second point in time.

8. The method of claim 3, wherein the range measurements further comprises:
- estimated direction and range measurement between the femtocell and a first wireless terminal at a first point in time;
- estimated direction and range measurement between the femtocell and the first wireless terminal at a second point in time.

9. The method of claim 3, wherein the range measurements further comprises:
- estimated direction and range measurement between the femtocell and a first wireless terminal at a first point in time; and
- estimated direction and range measurement between the femtocell and a second wireless terminal at the first point in time.

10. The method of claim 9, wherein the range measurements further comprises:
- estimated direction and range measurement between the femtocell and the first wireless terminal at a second point in time; and
- estimated direction and range measurement between the femtocell and the second wireless terminal at the second point in time.

11. The method of claim 1 further comprises:
- determining position of the femtocell in accordance with a weighted average position of the one or more wireless terminals.

12. The method of claim 1, wherein the authenticating the one or more wireless terminals comprises:
- matching hashed output of identities produced by the one or more wireless terminals against the list of authentication credentials; and
- identifying the one or more terminals to be genuine when the hashed output of identities is found in the list of authentication credentials.

13. The method of claim 1, wherein the receiving provisioning information from the network further comprises:
- receiving one or more frequencies from the network for operating the femtocell, wherein the one or more frequencies are selected based on the position of the femtocell to minimize interference between the femtocell and surrounding base stations.

14. The method of claim 1, wherein determining position of the femtocell further comprises:
- assigning a location of the one or more wireless terminals as the position of the femtocell.

15. An apparatus, comprising:
- one or more processors;
- a femtocell positioning module, working with the one or more processors, includes
- logic configured to identify one or more wireless terminals and receive location information from the one or more wireless terminals via a first communication channel, wherein each wireless terminal has obtained an initial position and performs repeated position updates with respect to one or more base stations, and wherein the first communication channel includes an out-of-band link between a femtocell and the one or more wireless terminals; and
- logic configured to determine position of the femtocell in accordance with the location information from the one or more wireless terminals;
- logic configured to receive provisioning information from a network based on the position of the femtocell, wherein the logic configured to receive provisioning information from the network comprises logic configured to receive a list of authentication credentials associated with the one or more wireless terminals from the network, and logic configured to authenticate the one or more wireless terminals using the list of authentication credentials; and
- a memory configured to store position of the femtocell.

16. The apparatus of claim 15, wherein logic configured to identify one or more wireless terminals through a first communication channel further comprises at least one of:
- logic configured to verify the one or more wireless terminals and the femtocell are located in a same subnet; and
- logic configured to verify the one or more wireless terminals and the femtocell are located in a same macro cell area.

17. The apparatus of claim 15, wherein logic configured to determine position of the femtocell comprises:
- logic configured to obtain multiple set of range measurements between the femtocell and the one or more wireless terminals; and
- logic configured to determine position of the femtocell in accordance with the location information and the multiple set of range measurements between the femtocell and the one or more wireless terminals.

18. The apparatus of claim 15, further comprises:
- logic configured to transfer data between the network and the one or more wireless terminals using a second communication channel, wherein the second communication channel includes a broadband network.

19. The apparatus of claim 15, wherein the out-of-band link includes at least one of Bluetooth and Wi-Fi, and wherein the out-of-band link includes Remote IP Access (RIPA) connections between the one or more wireless terminals and the femtocell.

20. The apparatus of claim 17, wherein the range measurements comprises:
- estimated range measurement between the femtocell and a first wireless terminal at a first point in time;
- estimated range measurement between the femtocell and the first wireless terminal at a second point in time; and
- estimated range measurement between the femtocell and the first wireless terminal at a third point in time.

21. The apparatus of claim 17, wherein the range measurements further comprises:
- estimated range measurement between the femtocell and a first wireless terminal at a first point in time;
- estimated range measurement between the femtocell and a second wireless terminal at the first point in time;
- estimated range measurement between the femtocell and the first wireless terminal at a second point in time; and
- estimated range measurement between the femtocell and the second wireless terminal at the second point in time.

22. The apparatus of claim 17, wherein the range measurements further comprises:
- estimated direction and range measurement between the femtocell and a first wireless terminal at a first point in time;
- estimated direction and range measurement between the femtocell and the first wireless terminal at a second point in time.

23. The apparatus of claim 17, wherein the range measurements further comprises:
- estimated direction and range measurement between the femtocell and a first wireless terminal at a first point in time; and
- estimated direction and range measurement between the femtocell and a second wireless terminal at the first point in time.

24. The apparatus of claim 23, wherein the range measurements further comprises:
  estimated direction and range measurement between the femtocell and the first wireless terminal at a second point in time; and
  estimated direction and range measurement between the femtocell and the second wireless terminal at the second point in time.

25. The apparatus of claim 15 further comprises:
  logic configured to determine position of the femtocell in accordance with a weighted average position of the one or more wireless terminals.

26. The apparatus of claim 15, wherein logic configured to determine position of the femtocell further comprises:
  logic configured to assign a location of the one or more wireless terminals as the position of the femtocell.

27. The apparatus of claim 15, wherein the logic configured to authenticate the one or more wireless terminals comprises:
  logic configured to match hashed output of identities produced by the one or more wireless terminals against the list of authentication credentials; and
  logic configured to identify the one or more terminals to be genuine when the hashed output of identities is found in the list of authentication credentials.

28. A computer program product for determining position of a femtocell, comprising a non-transitory medium storing computer programs for execution by one or more computer systems, the computer program product comprising:
  code for identifying one or more wireless terminals through a first communication channel, wherein each wireless terminal has obtained an initial position and performs repeated position updates with respect to one or more base stations, and wherein the first communication channel includes an out-of-band link between the femtocell and the one or more wireless terminals;
  code for receiving location information from the one or more wireless terminals via the first communication channel;
  code for determining position of the femtocell in accordance with the location information from the one or more wireless terminals; and
  code for receiving provisioning information from a network based on the position of the femtocell, wherein the code for receiving provisioning information from the network comprises code for receiving a list of authentication credentials associated with the one or more wireless terminals from the network, and code for authenticating the one or more wireless terminals using the list of authentication credentials.

29. The computer program product of claim 28, wherein code for identifying one or more wireless terminals through a first communication channel further comprises at least one of:
  code for verifying the one or more wireless terminals and the femtocell are located in a same subnet; and
  code for verifying the one or more wireless terminals and the femtocell are located in a same macro cell area.

30. The computer program product of claim 28, wherein code for determining position of the femtocell comprises:
  code for obtaining multiple set of range measurements between the femtocell and the one or more wireless terminals; and
  code for determining position of the femtocell in accordance with the location information and the multiple set of range measurements between the femtocell and the one or more wireless terminals.

31. The computer program product of claim 28, further comprises:
  code for transferring data between the network and the one or more wireless terminals using a second communication channel, wherein the second communication channel includes a broadband network.

32. The computer program product of claim 28, wherein the out-of-band link includes at least one of Bluetooth and Wi-Fi, and wherein the out-of-band link includes Remote IP Access (RIPA) connections between the one or more wireless terminals and the femtocell.

33. The computer program product of claim 30, wherein the range measurements comprises:
  estimated range measurement between the femtocell and a first wireless terminal at a first point in time;
  estimated range measurement between the femtocell and the first wireless terminal at a second point in time; and
  estimated range measurement between the femtocell and the first wireless terminal at a third point in time.

34. The computer program product of claim 30, wherein the range measurements further comprises:
  estimated range measurement between the femtocell and a first wireless terminal at a first point in time;
  estimated range measurement between the femtocell and a second wireless terminal at the first point in time;
  estimated range measurement between the femtocell and the first wireless terminal at a second point in time; and
  estimated range measurement between the femtocell and the second wireless terminal at the second point in time.

35. The computer program product of claim 31, wherein the range measurements further comprises:
  estimated direction and range measurement between the femtocell and a first wireless terminal at a first point in time;
  estimated direction and range measurement between the femtocell and the first wireless terminal at a second point in time.

36. The computer program product of claim 32, wherein the range measurements further comprises:
  estimated direction and range measurement between the femtocell and a first wireless terminal at a first point in time; and
  estimated direction and range measurement between the femtocell and a second wireless terminal at the first point in time.

37. The computer program product of claim 36, wherein the range measurements further comprises:
  estimated direction and range measurement between the femtocell and the first wireless terminal at a second point in time; and
  estimated direction and range measurement between the femtocell and the second wireless terminal at the second point in time.

38. The computer program product of claim 28 further comprises:
  code for determining position of the femtocell in accordance with a weighted average position of the one or more wireless terminals.

39. The computer program product of claim 28, wherein code for determining position of the femtocell further comprises:
  code for assigning a location of the one or more wireless terminals as the position of the femtocell.

40. The computer program product of claim 28, wherein the code for authenticating the one or more wireless terminals comprises:

code for matching hashed output of identities produced by the one or more wireless terminals against the list of authentication credentials; and code for identifying the one or more terminals to be genuine when the hashed output of identities is found in the list of authentication credentials.

41. A system for determining position of a femtocell, comprising:

means for identifying one or more wireless terminals through a first communication channel, wherein each wireless terminal has obtained an initial position and performs repeated position updates with respect to one or more base stations, and wherein the first communication channel includes an out-of-band link between the femtocell and the one or more wireless terminals;

means for receiving location information from the one or more wireless terminals via the first communication channel;

means for determining position of the femtocell in accordance with the location information from the one or more wireless terminals; and means for receiving provisioning information from a network based on the position of the femtocell, wherein the means for receiving provisioning information from the network comprises means for receiving a list of authentication credentials associated with the one or more wireless terminals from the network, and means for authenticating the one or more wireless terminals using the list of authentication credentials.

42. The system of claim 41, wherein means for determining position of the femtocell comprises:

means for obtaining multiple set of range measurements between the femtocell and the one or more wireless terminals; and means for determining position of the femtocell in accordance with the location information and the multiple set of range measurements between the femtocell and the one or more wireless terminals.

43. The system of claim 41, further comprises:

means for transferring data between the network and the one or more wireless terminals using a second communication channel, wherein the second communication channel includes a broadband network.

44. The system of claim 41 further comprises:

means for determining position of the femtocell in accordance with a weighted average position of the one or more wireless terminals.

45. The system of claim 41, wherein means for determining position of the femtocell further comprises:

means for assigning a location of the one or more wireless terminals as the position of the femtocell.

46. The system of claim 41, wherein the means for authenticating the one or more wireless terminals comprises:

means for matching hashed output of identities produced by the one or more wireless terminals against the list of authentication credentials; and means for identifying the one or more terminals to be genuine when the hashed output of identities is found in the list of authentication credentials.

* * * * *